United States Patent Office

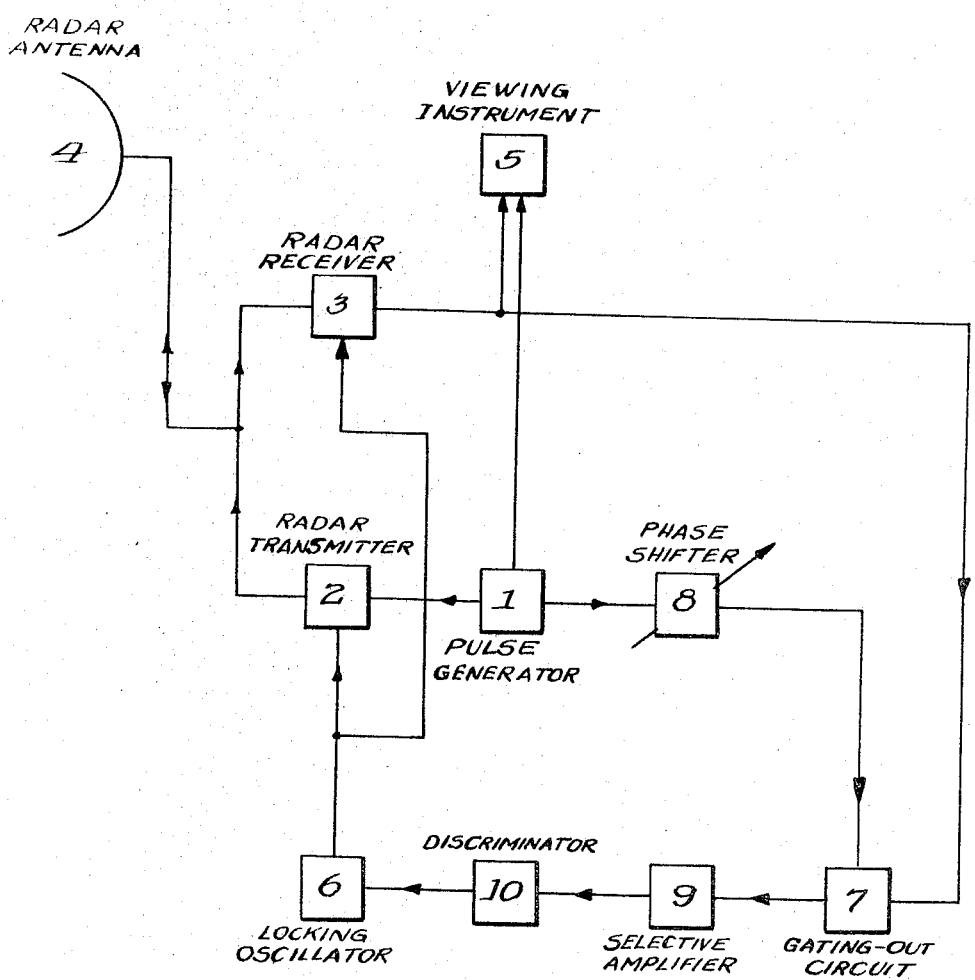

3,308,458
Patented Mar. 7, 1967

3,308,458
METHOD OF ELIMINATING THE SUSCEPTIBILITY TO INTERFERENCE OF RADAR DEVICES
Ernst Schulze, Koblenz, Germany, assignor to Siemens & Halske Aktiengesellschaft, Munich, Germany, a corporation of Germany
Filed May 16, 1955, Ser. No. 509,041
Claims priority, application Germany, May 18, 1954, Sch 15,360
2 Claims. (Cl. 343—8)

This invention is concerned with a method of and apparatus for limiting the indication of impulse-radar apparatus to predetermined flight targets.

It is known to use the Doppler frequency as a discriminating criterion between flight targets and interferring stationary targets; it being thereby presupposed that the high frequency oscillation starts of the successive pulses are coherent with respect to all impulses. This may in known manner be achieved by using a continuously oscillating low power locking oscillator for impressing on the transmitter tube of the radar transmitter a high frequency voltage of a magnitude which is somewhat in excess of the voltage level of extraneous noise or interference. The result of the use of such locking oscillator is that the high frequency phase position of the pulse being built up will be in each pulse coherent to the phase position of the respectively preceding pulse.

However, the use of the Doppler effect for excluding stationary targets fails in the case of reflecting electrical interference signals which have with respect to the observation point a radial velocity different from zero.

The invention proposes to limit the indication of radar-impulse apparatus to predetermined flight targets, by evaluating the frequency difference between the radiated transmitter oscillation and the received oscillations affected by the Doppler effect, employing for the control of the transmitter a locking oscillator which secures the coherence of the transmitted oscillations, and varying the frequency of the locking oscillator to effect a selective control with respect to the difference frequency to be obtained at the receiver.

The above indicated operation is according to the invention realized by filtering out, in the receiver, a fixed difference frequency which is to be used as a basis for the evaluation of measurement, and by adjusting and subsequently automatically regulating the locking oscillator in such a manner that a selected flight target will deliver this fixed difference frequency (constant Doppler frequency) even in the presence of alteration in its relative speed.

The above indicated frequency variation of the locking oscillator separates from the observation by the radar apparatus reflecting interference targets productive of a Doppler frequency different from that received from the air ships that are to be observed. The invention accordingly permits observation, for example, of air ships flying in rain clouds or reflecting clouds of different kind, thus making it possible to observe with certainty and assurance a selected flight target independent of its momentary flight speed and flight direction.

The invention may also be used for measuring the radial speed of the selected flight target with respect to the place of observation. The frequency variation of the locking oscillator is in such case a criterion for the radial speed of the flight target.

The Doppler frequency derived from the reflected pulses of the desired target may be conducted, for example, over a resonance amplifier and/or filter, to a frequency discriminator, the output voltage of which is used for regulating the frequency of the locking oscillator or another suitable tuning means so as to maintain the Doppler frequency constant, that is, so as to produce a fixed difference frequency.

A suitable demodulator is required for deriving the Doppler frequency from the pulses reflected from the desired target. A demodulator adapted to produce impulses must be employed since the Doppler frequency occurs only for the duration of the reflected signals.

In accordance with another feature of the invention, an amplifier stage is used as a demodulator for obtaining the Doppler frequency, such amplifier stage being opened by a segregating or scanning-out pulse, the sequence frequency of which corresponds to the impulse frequency of the radar apparatus. A satisfactory demodulation presupposes, of course, that the frequency to be thereby obtained is not higher than half of the sequence frequency of the segregating or scanning-out pulse. In order to obtain satisfactory demodulation, the width or duration of the segregating or scanning-out pulse must be kept within close limits.

In accordance with a further feature of the invention, the width or duration of the scanning-out pulse is of a magnitude, such that it can embrace a half wave or an odd multiple of a half wave of the carrier frequency to be demodulated.

The scanning-out pulse extracts from the target signal the Doppler frequency contained therein and conducts it, for example, to a low frequency amplifier which has a resonance frequency of about 2 kc. To the output of the amplifier is connected a frequency discriminator tuned to 2 kc. The directional voltage occurring at the output of the discriminator controls the frequency of the locking oscillator so as to obtain continuously a fixed difference frequency or constant Doppler frequency of 2 kc.

Rotating (or non-keyed) antennae are frequently used for determining the positional coordination of a target (lateral angle and elevation angle), the directional frequency being, for example, on the order of 25 cycles. The Doppler frequency obtained from the reflected pulses, for example, by means of a scanning gate, is amplitude-modulated by the directional frequency.

The above indicated and further objects and features of the invention will appear from the description which is rendered below with reference to the accompanying drawing, showing in block diagram manner the circuit of radar apparatus according to the invention.

The sole figure of drawing is a schematic block diagram depicting applicant's radar system.

Referring now to the drawing, a pulse generator 1 controls the high frequency radar transmitter 2 which is in common with the receiver 3 connected to the radar antenna 4. The radar targets may be observed in known manner at the instrument 5. The locking oscillator 6 delivers to the radar transmitter 2 a relatively low voltage for securing the coherence of the radiated oscillations. The locking oscillator is also connected with the receiver 3 for obtaining the Doppler frequency. A segregating or scanning-out gate 7, controlled by the pulse generator 1 over an adjustable phase shifter 8, segregates or extracts from the reflected signals obtained at the receiver 3, the Doppler frequency which is conducted over a resonance amplifier 9 to the frequency discriminator 10. The output voltage of the frequency discriminator 10 is used for regulating the tuning of the locking oscillator 6 in such a manner that a constant Doppler frequency is obtained from a selected flight target even in the presence of alterations of its relative speed.

Known and suitable means is also provided (not shown) for automatically controlling the receiver in known manner so that it will always be opened only for the duration of a target signal.

Since it cannot be expected that the Doppler frequency occurring is at the start of the measuring within the discriminator curve, it is necessary, to place the frequency within the regulation range of the discriminator; this may be done in known manner by manual operation and listening-in, for example, by means of a head set and coarse indication of the Doppler frequency on a known and suitable instrument. The frequency width of the regulation range may be limited to about ±50 ... 100 cycles.

The advantage obtained by the radar apparatus according to the invention resides in the fact that an air ship flying in moving and reflecting clouds can be observed with certainty independent of its momentary flight speed and flight direction.

The various devices required as shown in the drawing, to obtain the described operations and to fulfill the intentions of the invention may be constructed in accordance with principles and with means well known in the art.

I claim:

1. Radar apparatus for observing air-borne targets comprising a transmitter for transmitting impulses, a locking oscillator for impressing upon transmitted pulses a frequency to secure coherence of the transmitted pulses, a receiver for receiving oscillations reflected from a selected target, said reflected oscillations being affected by the Doppler effect of said impressed pulses, means in said receiver for filtering from said received oscillations the Doppler frequency, means for automatically regulating said locking oscillator so as to obtain from said received oscillations a fixed Doppler frequency regardless of alterations in the flight speed of said selected target, and means for evaluating the frequency difference between transmitted and received oscillations.

2. An apparatus according to claim 1, comprising control means for receiving the Doppler frequency derived from said reflected oscillations, and means for conducting the output of said control means to said locking oscillator for the regulation thereof to produce a constant Doppler frequency.

References Cited by the Examiner

UNITED STATES PATENTS

| | | | |
|---|---|---|---|
| 2,516,356 | 7/1950 | Tull | 343—7.3 |
| 2,541,066 | 2/1951 | Jaynes | 343—8 |
| 2,710,398 | 6/1955 | Emslie | 343—7.7 |
| 2,714,205 | 7/1955 | Grayson | 343—9 |

CHESTER L. JUSTUS, *Primary Examiner.*

NORMAN H. EVANS, FREDERICK M. STRADER,
*Examiners.*

R. D. BENNETT, *Assistant Examiner.*